(12) United States Patent
Hart et al.

(10) Patent No.: US 8,813,935 B2
(45) Date of Patent: Aug. 26, 2014

(54) LAUNCH / DISCONNECT CLUTCH FOR P2 HYBRID POWERTRAIN

(75) Inventors: James M. Hart, Belleville, MI (US); Edwin T. Grochowski, Howell, MI (US); Anthony L. Smith, Troy, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 22 days.

(21) Appl. No.: 13/313,878

(22) Filed: Dec. 7, 2011

(65) Prior Publication Data

US 2012/0175212 A1    Jul. 12, 2012

Related U.S. Application Data

(60) Provisional application No. 61/432,178, filed on Jan. 12, 2011.

(51) Int. Cl.
| | |
|---|---|
| *F16D 25/06* | (2006.01) |
| *B60K 6/38* | (2007.10) |
| *F16D 25/12* | (2006.01) |
| *B60K 6/387* | (2007.10) |
| *F16D 25/0638* | (2006.01) |
| *B60K 6/48* | (2007.10) |

(52) U.S. Cl.
CPC ............... *B60K 6/48* (2013.01); *F16D 25/123* (2013.01); *B60Y 2400/4244* (2013.01); *B60K 6/387* (2013.01); *B60K 2006/4825* (2013.01); *F16D 25/0638* (2013.01); *Y02T 10/6252* (2013.01); *Y02T 10/6221* (2013.01)

USPC .................. 192/85.25; 180/65.25; 192/113.5; 192/55.61; 192/85.41

(58) Field of Classification Search
USPC ....................................... 192/85.25
See application file for complete search history.

(56) References Cited

U.S. PATENT DOCUMENTS

| | | | | |
|---|---|---|---|---|
| 5,281,190 | A * | 1/1994 | Koivunen | 475/116 |
| 6,668,953 | B1 * | 12/2003 | Reik et al. | 180/53.8 |
| 7,293,637 | B2 * | 11/2007 | Janson et al. | 192/48.611 |
| 7,320,391 | B2 * | 1/2008 | Zagrodzki et al. | 192/70.14 |
| 7,954,578 | B2 | 6/2011 | Kim et al. | |
| 8,322,503 | B2 * | 12/2012 | Combes et al. | 192/48.8 |
| 8,556,010 | B2 * | 10/2013 | Ebert et al. | 180/65.25 |
| 2004/0256193 | A1 * | 12/2004 | Ichikawa | 192/85 AA |
| 2007/0108857 | A1 * | 5/2007 | Nomura et al. | 310/78 |
| 2010/0288597 | A1 * | 11/2010 | Kuwahara et al. | 192/85.61 |
| 2011/0221292 | A1 * | 9/2011 | Kuwahara et al. | 310/78 |

\* cited by examiner

*Primary Examiner* — Gene Crawford
*Assistant Examiner* — Mark Manley

(57) ABSTRACT

A launch and disconnect clutch for the electric motor of a P2 hybrid powertrain is compact and provides improved operation. The clutch is mounted between the engine and transmission in the space formerly occupied by the torque converter. The clutch assembly is configured so that actuation, compensation and cooling are provided by only two oil channels. The clutch utilizes single-sided reaction plates which achieve high clutch gain thereby providing high torque capacity under electric operation and improved launch shudder characteristics.

17 Claims, 2 Drawing Sheets

LAUNCH / DISCONNECT CLUTCH FOR P2 HYBRID POWERTRAIN

CROSS REFERENCE TO RELATED APPLICATION

This application claims the benefit of U.S. Provisional Patent Application Ser. No. 61/432,178, filed Jan. 12, 2011, which is hereby incorporated in its entirety herein by reference.

FIELD

The present disclosure relates to a clutch for a P2 hybrid powertrain and more particularly to a launch and disconnect clutch for a P2 hybrid power train for a motor vehicle.

BACKGROUND

The statements in this section merely provide background information related to the present disclosure and may or may not constitute prior art.

Extensive engineering and design effort is currently directed to hybrid powertrains for motor vehicles, especially passenger cars. One of the most promising and active areas involves the addition of an electric motor and an associated battery and electronic controller to a motor vehicle powertrain to supplement torque for launches in order that a smaller internal combustion engine may be utilized in the vehicle. Lower horsepower and smaller displacement engines routinely provide improved fuel economy over larger engines and, when supplemented by an electric motor for vehicle launch, provide entirely satisfactory overall performance.

Accordingly, many hybrid powertrains begin as adaptations of conventional and existing powertrains utilizing an internal combustion engine and a transmission having a torque converter and multiple planetary gear assemblies. Into this powertrain is added an electric motor and an appropriate launch and disconnect clutch. Frequently, the torque converter is removed. The addition is not without significant challenges, however, as such constraints as axial length, housing outside diameter, clutch actuation, clutch cooling and integration into the existing powertrain components must be addressed and resolved.

The present invention is directed to a launch and disconnect clutch for a P2 hybrid powertrain which addresses and solves the above-delineated challenges.

SUMMARY

The present invention provides a launch and disconnect clutch for the electric motor of a P2 hybrid powertrain. The clutch is mounted between the engine and transmission in the space formerly occupied by the torque converter. The clutch assembly is configured so that actuation, compensation and cooling are provided by only two oil channels. The clutch utilizes single-sided reaction plates which achieve high clutch gain thereby providing high torque capacity during electric operation and improved launch shudder characteristics.

Thus it is an aspect of the present invention to provide a launch and disconnect clutch for a P2 hybrid powertrain.

It is a further aspect of the present invention to provide a launch and disconnect clutch for the electric motor of a P2 hybrid powertrain.

It is a still further aspect of the present invention to provide a launch and disconnect clutch for mounting between the engine and transmission of a hybrid powertrain.

It is a still further aspect of the present invention to provide a launch and disconnect clutch for a P2 hybrid powertrain in the space typically occupied by the torque converter.

It is a still further aspect of the present invention to provide a launch and disconnect clutch for a P2 powertrain configured so that actuation, compensation and cooling are provided by only two oil channels.

It is a still further aspect of the present invention to provide a launch and disconnect clutch for a P2 powertrain utilizing single-sided reaction plates which achieve high clutch gain.

It is a still further aspect of the present invention to provide a launch and disconnect clutch for a P2 powertrain utilizing single-sided reaction plates which achieve high clutch gain and torque capacity under electric operation and reduced launch shudder.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
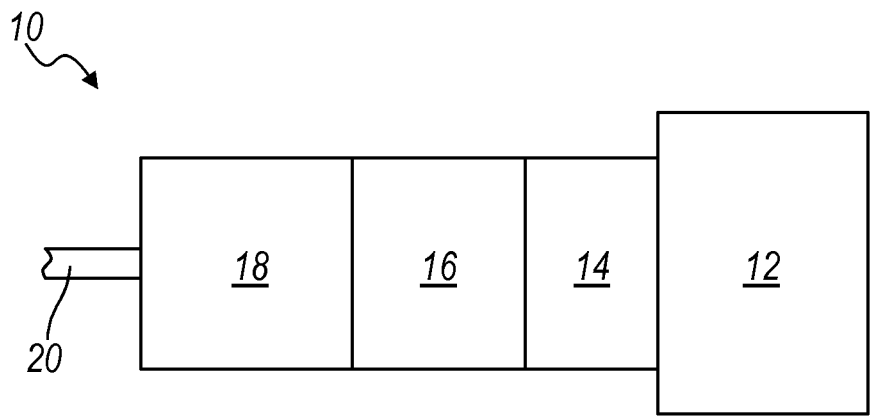
FIG. 1 is a block diagram of a P2 hybrid powertrain incorporating the present invention.

With reference to FIG. 1, a P2 hybrid powertrain incorporating the present invention is generally illustrated and designated by the reference number 10. The P2 hybrid powertrain 10 includes a prime mover 12 such as an internal combustion gas, Diesel or flex-fuel engine. The prime mover 12 directly drives a damper 14 which, in turn, directly drives an electric motor and clutch module or assembly 16. The output of the electric motor and clutch assembly 16 directly drives a transmission 18 typically including a plurality of planetary gear sets (not illustrated) which provide drive torque to an output shaft 20.

Figure 3:
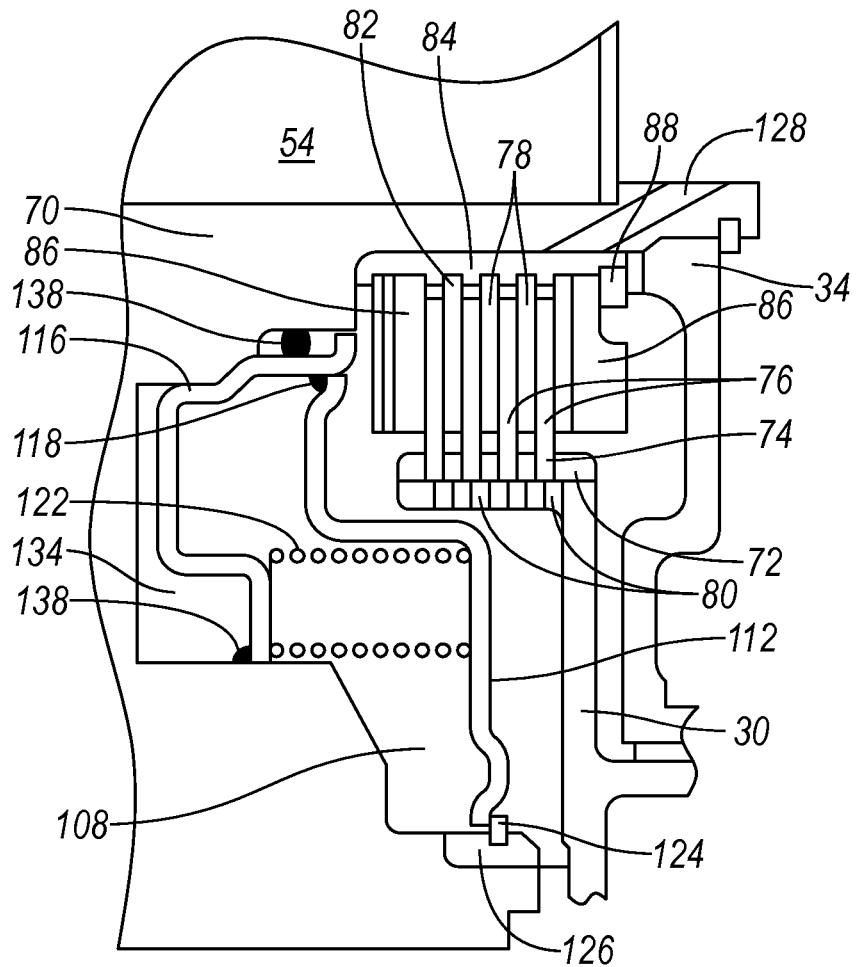
FIG. 3 is an enlarged, fragmentary, sectional view of a launch/disconnect clutch and compensator according to the present invention.
Figure 2:
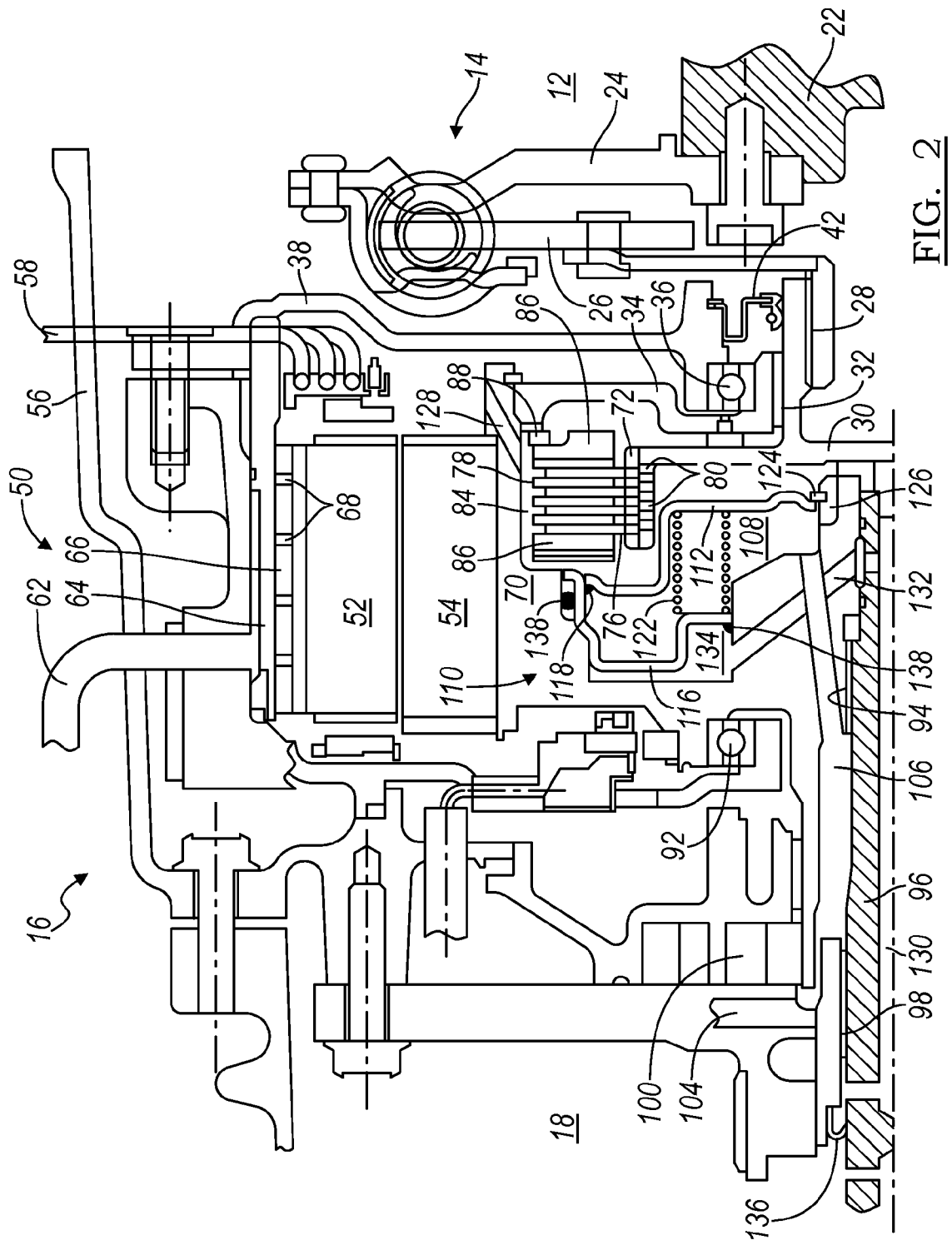
FIG. 2 is a fragmentary, sectional view of a portion of a P2 hybrid powertrain transmission incorporating the present invention.

Referring now to FIGS. 2 and 3, the prime mover 12 includes a crankshaft 22 which is secured to an input plate 24 of the damper 14. An output plate 26 of the damper 14 is coupled though a splined interconnection 28 to a clutch (input) hub 30 of the electric motor and clutch assembly 16. The clutch (input) hub 30 is supported for rotation on a first roller bearing assembly 32 which, in turn, is supported by a motor hub 34. The motor hub 34 is supported for rotation on a first ball bearing assembly 36 which is mounted in a stationary web or flange or bulkhead 38. A fluid tight seal 42 also extends between the input hub 30 and the web or flange 38 and separates a dry region which contains the damper 14 and a wet region which contains the components of the electric motor and clutch module or assembly 16.

The electric motor and clutch module or assembly 16 includes an electric motor 50 having a stator 52 and a rotor 54.

The stator 52 is disposed within and secured to a housing 56 and is therefore stationary. Electric power is provided to the stator 52 through electrical conductors or cables 58 which pass through the housing 56 in suitable sealing and insulating feedthroughs (not illustrated). Cooling oil is provided to the periphery of the stator 52 through an oil or hydraulic fluid line 62. The oil line 62 opens into a circumferential or annular region 64 which surrounds the periphery of the stator 52. A circumferential or annular plate or separator 66 defining a plurality of through openings or apertures 68 evenly distributes the cooling oil around the stator 52.

The rotor 54 of the electric motor 50 is coupled to a clutch (output) hub 70 which is also coupled to and supported by the motor hub 34. The clutch (input) hub 30 includes male splines 72 which engage complementary female splines 74 on a first plurality of single sided friction clutch plates or discs 76. The first plurality of single sided friction clutch plates or discs 76 are interleaved with a second plurality of single sided clutch plates or discs 78 having male splines 82 which engage complementary female splines 84 on the clutch (output) hub 70. At the ends of the friction clutch pack comprising the first and second pluralities of clutch plates 76 and 78, are a pair of annular end plates 86 which are retained on the clutch (output) hub 70 by a snap ring 88 or a similar device.

The clutch (output) hub 70 is also supported for rotation by a second ball bearing assembly 92 and, through a splined interconnection 94, drives an input shaft 96 which supplies drive torque to the planetary gear sets of the transmission 18.

The input shaft 96 of the transmission 18 is coupled to and drives a hydraulic pump 100 which may be a vane, gear or gerotor pump. The pressurized output of the hydraulic pump 100 is fed through an outlet line (not illustrated) to a valve body (also not illustrated) and other components of the transmission 18. Pressurized oil or hydraulic fluid flow from the valve body returns in a line 104 and flows though an axial and oblique passageway 106 and into a compensating chamber 108 of a hydraulic clutch actuator assembly 110. The compensating chamber 108 is defined by a balance dam or compensator 112 and a piston 116. The balance dam or compensator 112 is circular with radially oriented inner and outer end regions connected by an axial, cylindrical region. The outer (larger diameter) edge includes a seal 118 which seals against an inner surface of the piston 116. A compression spring 122 extends between the compensator 112 and the piston 116 and functions as a return spring for the piston 116. The inner (smaller diameter) edge of the compensator 112 abuts a snap ring 124 which limits translation of the compensator 112. The snap ring 124 is set into a plurality of shallow channels or female splines 126 which provide a plurality of paths for hydraulic fluid or oil low toward a plurality of radial passageways 80 which like wise provide a plurality of paths for the fluid or oil toward the friction clutch plates or discs 76 and 78 to achieve cooling thereof. Such fluid or oil exits the region of the friction clutch plates or discs 76 and 78 through a plurality of oblique passageways 128.

The input shaft 96 of the transmission 18 also includes an internal axial passageway 130 which is selectively provided with pressurized oil or hydraulic fluid from the valve body to control actuation of the piston 116 and engagement of the friction clutch plates or discs 76 and 78. Pressurized oil or hydraulic fluid in the axial passageway 130 flows into an oblique passageway 132 and into an actuation chamber 134. The piston 116 which is shaped somewhat similarly to the balance dam or compensator 112 includes seals 138 which contain the pressurized oil or hydraulic fluid within the actuation chamber 134. Increased hydraulic fluid or oil pressure within the actuation chamber 134 translates the piston 116 against the compression spring 122 and toward the friction clutch plates or discs 76 and 78, compressing them and connecting the clutch input hub 30 to the clutch output hub 70 to allow torque transfer therebetween.

The description of the invention is merely exemplary in nature and variations that do not depart from the gist of the invention are intended to be within the scope of the invention. Such variations are not to be regarded as a departure from the spirit and scope of the invention.

What is claimed is:

1. A launch and disconnect clutch assembly for a hybrid powertrain comprising, in combination,
    a clutch input member and a first plurality of clutch plates splined to said clutch input member,
    a clutch output member and a second plurality of clutch plates splined to said clutch output member and interleaved with said first plurality of clutch plates,
    a hydraulic clutch actuator for compressing said pluralities of clutch plates and having a compensating chamber and an actuation chamber,
    a damper assembly having an input adapted to be driven by a prime mover and an output coupled to said clutch input member,
    an electric motor including a rotor coupled to said clutch output member, a stator and a cooling fluid passageway surrounding said stator,
    a transmission input shaft directly coupled to said clutch output member,
    a first axial passageway within said transmission input shaft for providing hydraulic fluid to said actuation chamber of said hydraulic clutch actuator, a second axial passageway adjacent an outer surface of said transmission input shaft for providing hydraulic fluid to said compensating chamber of said hydraulic clutch actuator and a third passageway between said compensating chamber and said first and second pluralities of clutch plates for providing hydraulic fluid to said first and second pluralities of clutch plates.

2. The launch and disconnect clutch assembly of claim 1 further including a fluid tight seal mounted to a bulkhead disposed between said output of said damper assembly and said clutch input member.

3. The launch and disconnect clutch assembly of claim 1 further including a piston disposed in said hydraulic clutch actuator between said compensating chamber and said actuation chamber.

4. The launch and disconnect clutch assembly of claim 1 further including a compression spring disposed within said compensating chamber.

5. The launch and disconnect clutch assembly of claim 1 further including interengaging splines disposed on said clutch input member and an inner edge of said first plurality of clutch plates and on said clutch output member and an outer edge of said second plurality of clutch plates.

6. The launch and disconnect clutch assembly of claim 1 wherein said first and second pluralities of clutch plates are single sided.

7. A launch and disconnect clutch assembly for a hybrid powertrain comprising, in combination,
    an inner clutch input hub defining a plurality of male splines and a first plurality of clutch plates splined to said clutch input hub,
    an outer clutch output hub defining a plurality of female splines and a second plurality of clutch plates splined to said clutch output hub and interleaved with said first plurality of clutch plates, a hydraulic clutch actuator having a piston operably associated with said pluralities of clutch plates and defining a compensating chamber and an actuation chamber, a damper assembly having an input adapted to be driven by a prime mover and an output coupled to said clutch input member, an electric motor having a rotor coupled to said clutch output hub, a stator and a circumferential fluid passageway for providing cooling fluid to said stator, a transmission input shaft coupled to said clutch output hub, a first axial passageway within said transmission input shaft for providing hydraulic fluid to said actuation chamber of said hydraulic clutch actuator, a second axial passageway adjacent an outer surface of said transmission input shaft for providing hydraulic fluid to said compensating chamber of said hydraulic clutch actuator, and a third passageway between said compensating chamber and said first and second pluralities of clutch plates for providing hydraulic fluid to said first and second pluralities of clutch plates.

8. The launch and disconnect clutch assembly of claim 7 further including a fluid seal mounted to a bulkhead and disposed between said output of said damper assembly and said clutch input member.

9. The launch and disconnect clutch assembly of claim 7 further including a compression spring disposed within said compensating chamber.

10. The launch and disconnect clutch assembly of claim 7 further including interengaging splines disposed on said clutch input hub and an inner edge of said first plurality of clutch plates and on said clutch output hub and an outer edge of said second plurality of clutch plates.

11. The launch and disconnect clutch assembly of claim 7 wherein said first and said second pluralities of clutch plates are single sided.

12. A launch and disconnect clutch assembly for a hybrid powertrain comprising, in combination, a damper assembly having an input adapted to be driven by a prime mover and an output, a friction clutch having an inner clutch input hub defining a plurality of male splines and coupled to said output of said damper assembly and a first plurality of clutch plates splined to said clutch input hub, an outer clutch output hub defining a plurality of female splines and a second plurality of clutch plates splined to said clutch output hub and interleaved with said first plurality of clutch plates, and a hydraulic clutch actuator having a piston aligned with said pluralities of clutch plates, said piston defining a compensating chamber and an actuation chamber and a compression spring disposed in said compensating chamber and biasing said piston, an electric motor having a rotor coupled to said clutch output hub, a stator and a circumferential fluid passageway for providing cooling fluid to said stator, a transmission input shaft directly coupled to said clutch output hub, a first axial passageway within said transmission input shaft for providing hydraulic fluid to said actuation chamber of said hydraulic clutch actuator, a second axial passageway adjacent an outer surface of said transmission input shaft for providing hydraulic fluid to said compensating chamber of said hydraulic clutch actuator, and a third passageway communicating between said compensating chamber and said friction clutch for providing hydraulic fluid to said first and second pluralities of clutch plates.

13. The launch and disconnect clutch assembly of claim 12 further including a fluid seal mounted to a bulkhead and disposed between said output of said damper assembly and said clutch input hub.

14. The launch and disconnect clutch assembly of claim 12 further including interengaging splines disposed on said clutch input hub and an inner edge of said first plurality of clutch plates and on said clutch output hub and an outer edge of said second plurality of clutch plates.

15. The launch and disconnect clutch assembly of claim 12 wherein said first and said second pluralities of clutch plates are single sided.

16. The launch and disconnect clutch assembly of claim 1 wherein said clutch input member defines an inner hub having a plurality of male splines and said clutch outer member defines an output hub having a plurality of female splines.

17. The launch and disconnect clutch assembly of claim 7 wherein said transmission input shaft is directly coupled to said clutch output hub.

* * * * *